United States Patent [19]
Banbury

[11] 3,901,259
[45] Aug. 26, 1975

[54] PRESSURE RELIEF APPARATUS

[75] Inventor: Alan Reginald Banbury, Tettenhall, England

[73] Assignee: Marston Excelsior Limited, Staffordshire, England

[22] Filed: Sept. 6, 1974

[21] Appl. No.: 503,703

Related U.S. Application Data

[63] Continuation of Ser. No. 320,178, Jan. 2, 1973, abandoned.

[30] Foreign Application Priority Data

June 12, 1972 United Kingdom............... 27256/72

[52] U.S. Cl................................ 137/68; 220/89 A
[51] Int. Cl............................................. F16k 17/02
[58] Field of Search ..... 137/67, 68; 220/44 R, 89 A

[56] References Cited
UNITED STATES PATENTS 3,294,277  12/1966  Wood .............................. 220/89 A

*Primary Examiner*—Martin P. Schwadron
*Assistant Examiner*—George L. Walton
*Attorney, Agent, or Firm*—Cushman, Darby & Cushman

[57] ABSTRACT

Safety pressure relief apparatus having a reverse buckling pressure relief disc secured by its edge region between two support members solely by virtue of the axial pressure exerted upon the disc by the support members and the area of the edge region of the disc being such that when the disc is reversed upon build up of pressure within a vessel, the edge region is released from between the two support members by radial movement inwards of the disc.

5 Claims, 1 Drawing Figure

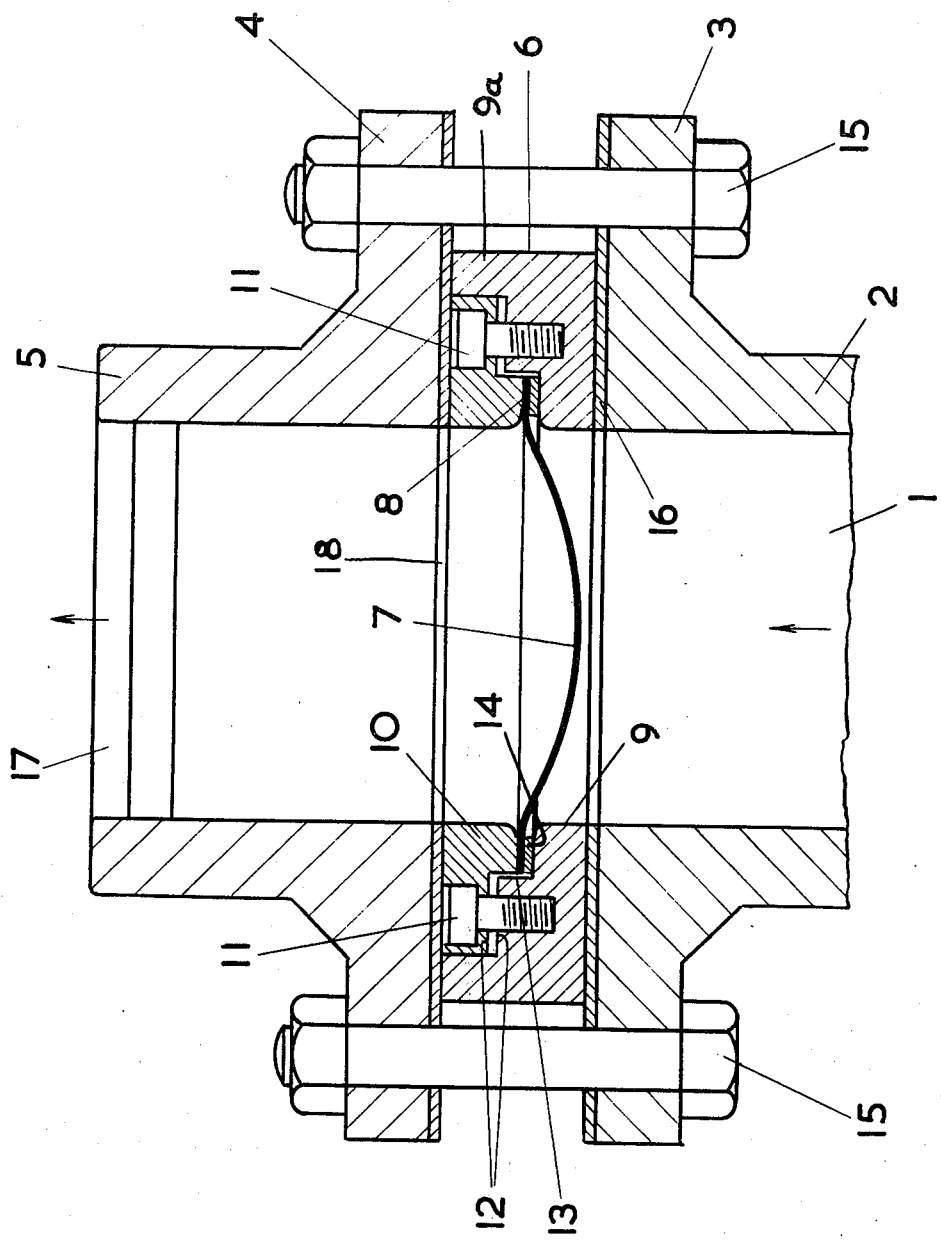

PRESSURE RELIEF APPARATUS

This is a continuation of application Ser. No. 320,178 filed Jan. 2, 1973, now abandoned.

BACKGROUND OF THE INVENTION

1. Field of the Invention

This invention relates to safety pressure relief apparatus of the kind having a reverse buckling pressure relief disc.

2. Description of the Prior Art

A reverse pressure relief disc as referred to in this specification has a central portion which is convex on one side and concave on the other and is held between two annular members around an edge region of the disc, one of the members being on the same side of the disc as the convex portion and being known as the inner support member and the other member being known as the outer support member. In use, the pressure relief apparatus incorporating the disc and support members is located upon a vessel with the convex side of the disc facing towards the interior of the vessel so as to be in direct contact with the fluid contained within the vessel. When the fluid pressure within the vessel reaches a predetermined limit, it causes the disc to reverse itself.

In one known construction of safety pressure relief apparatus incorporting reverse buckling pressure relief discs, cutting devices are provided on the outer side of the discs whereby when the discs are reversed, they become impaled on the cutting devices and are thus punctured so as to allow the fluid under pressure to escape from the vessel. These discs are normally referred to as reverse buckling pressure relief discs which are not intended to rupture upon contact with cutting devices but are intended to become reversed and then are forced by fluid pressure to move from the position in which they are located so as to enable the fluid to escape from vessels. In one known construction, a reverse pressure relief disc of the latter construction is located in a pressure relief passage with the edge of the disc disposed against an annular shoulder which faces inwardly towards the interior of the pressure vessel. The edge of the disc is sealed against this shoulder by being soldered to it. The soldering operation is considered to be inconvenient to perform and it would be advantageous to avoid it.

SUMMARY OF THE INVENTION

According to the present invention, safety pressure relief apparatus comprises a reverse buckling pressure relief disc having an edge region secured between inner and outer support members solely by axial pressure exerted upon the disc by planar parallel gripping surfaces of the members, the area of the edge region being such that when the disc is reversed upon the attainment of predetermined pressure within a vessel, the edge region is caused to move radially inwards from between and is released from the support members.

It is preferred that an abutment is provided for the radially outer edge of the disc.

For the above construction to operate in the required manner, it is essential that the gripping surfaces of the members are planar and parallel so that there is no tendency for the members to increase their grip upon the edge region when it commences to move from between them. For any particular disc the area of edge region gripped depends upon the pressure of the fluid which the disc is desired to withstand. For instance, upon aa 6 inch diameter disc intended to reverse and become released from between members at a predetermined pressure of 200 psi, the width of the edge being gripped should be about one-eighth inch. If this pressure were increased to 500 psi, the edge width being gripped should be about three-sixteenth inch.

BRIEF DESCRIPTION OF THE DRAWING

One embodiment of the invention will now be described by way of example with reference to the accompanying drawing which is a cross-sectional view of safety pressure relief apparatus installed on the outside of a vessel.

DESCRIPTION OF THE PREFERRED EMBODIMENT

A vessel (not shown) comprises a fluid pressure relief outlet 1 defined within a pipe 2 having a flange 3. Between the flange 3 of the pipe and an opposing flange 4 of another pipe 5, is located a safety pressure relief apparatus 6, and the flanges 3 and 4 provide a holding means for the apparatus 6.

The apparatus 6 comprises a reverse buckling pressure relief disc 7 having its convex side inwardly directed towards the pressure vessel as is conventional. The disc 7 is retained by an edge region 8 between an annular inner support member 9 and an annular outer support member 10. The disc is secured between the two members solely by axial pressure exerted on the disc by the members and this pressure is created by set screws 11 which are disposed radially outwardly of the disc and secure the two support members together. So that the holding pressure of the flanges 3 and 4 will not tend to increase the pressure upon the disc, the one support member is retained axially between the two ends of the other support member and these two ends are gripped between the flanges 3 and 4. In this embodiment, the outer member 10 is disposed radially within an axial end portion 9a of the inner member 9 so that the member 10 lies between the two ends of member 9 when the correct pressure is applied to the disc.

In the assembled condition of the assembly, there is a gap between opposing faces 12 of the two members 9 and 10 which ensures that there is axial compression around the edge region 8 of the disc. An abutment for the edge of the disc is created by an axially extending shoulder 13 of the inner support member 9. A gasket 14 is held between the edge region 8 of the disc and the support member 9 to ensure that pressurized fluid within the vessel does not escape around the edge regions while the disc remains in place. The apparatus 6 is held between the two flanges 3 and 4 by nuts and bolts 15 which pass between these two flanges and a gasket 16 is disposed between the flange 3 and the member 9 to prevent the leak of fluid under pressure. Within the outlet passage defined by the pipe 5, a grid device 17 is securely located in position to prevent the complete escape of the disc 7 from the pipe 5 when it is released from its mounting between the support members.

In use of the apparatus, when the pressure within the vessel reaches a predetermined limit to distort the disc, it causes reversal of the disc in the conventional way and as the pressure continues, it causes the disc to move down the pipe 5 whereby causing the edge regions 8 of the disc to be removed from between support members 9 and 10. The disc then travels as far as the grid 17 and the fluid under pressure escapes around the disc and through the grid.

To ensure that escaping pressurised fluid is allowed to pass only through the pipe 5 and not between the members 9 and 10 through the gap provided by the removal of disc 7, the end portion 9a of the member 9 is held in sealing engagement with the flange with a gasket 18 by virtue of the pressure applied by the nuts and bolts 15.

In a modification of the above described embodiment, a gasket similar to gasket 14 is disposed between edge region 8 of the disc and member 10. Alternatively, the cases where a fluid-tight seal is created between the edge region 8 and the member 9 by axial pressure of the members upon the disc, then no gasket between the edge region and either member may be necessary.

The above described embodiment and the modifications employ the use of a pressure relief disc which is removed completely from its position of location by pressurised fluid but in the construction described because of the method of holding the disc the use of soldering employed on other discs of this type for location and sealing is avoided.

I claim:

1. A safety pressure relief apparatus comprising a reverse bucking pressure relief disc having an edge and edge regions of a given area, inner and outer support members having a planar parallel gripping surfaces, said disc being secured between said members solely by axial pressure exerted upon said edge regions of said given area of said disc by said planar parallel gripping surfaces, said given area of said edge regions being so dimensioned and said axial pressure being such that when said disc is reversed upon the attainment of a predetermined pressure said edge regions are caused to move radially inwards from between and are released from said support members, and abutment means disposed around said edge of said disc and around the parallel gripping surfaces for restricting radially outward expansion of said edge of said disc, said abutment means comprises an axially extending shoulder on one of said support members parallel to an axial extending shoulder on the other support member which is disposed radially within an axial end portion of said one support member so that said other support member lies between two axial ends of said one support member.

2. Apparatus as recited in claim 1 wherein said safety pressure relief apparatus is responsive to pressure in a vessel, means for preventing complete escape of said disc from said vessel when said disc is released from between said supporting members being provided on the outlet side of said disc.

3. Apparatus as recited in claim 2 wherein said means for preventing escape of said disc from said vessel comprises a grid disposed within an outlet passage of said vessel.

4. A safety pressure relief apparatus for use in a pressure vessel comprising a reverse buckling pressure relief disc having an edge and edge regions of a given area, inner and outer support members having planar parallel gripping surfaces, said disc being secured between said members solely by axial pressure exerted upon said edge regions of said given area by said planar parallel gripping surfaces, said given area of said edge regions being so dimensioned and said axial pressure being such that when said disc is reversed upon the attainment of a predetermined pressure within said pressure vessel said edge regions are caused to move radially inwards from between and are released from said support members, abutment means disposed around said edge of said disc and around the parallel gripping surfaces for restricting radially outward expansion of said edge of said disc, one of said inner and outer support members being retained axially between the ends of said other member and a holding means for retaining said inner and outer members therebetween, the holding means gripping the ends of said other member and avoiding axial pressure upon said one member so as not to increase the axial pressure upon the disc.

5. A safety pressure relief apparatus for use in a pressure vessel comprising, a reverse buckling pressure relief disc having an edge and edge regions of a given area, inner and outer support members having planar parallel gripping surfaces, said disc being secured between said members solely by axial pressure exerted upon said edge regions of said given area by said planar parallel gripping surfaces, said given area of said edge regions being so dimensioned and said axial pressure being such that when said disc is reversed upon the attainment of a predetermined pressure within said pressure vessel said edge regions are caused to move radially inwards from between and are released from said support members, abutment means disposed around said edge of said disc and around the parallel gripping surfaces for restricting radially outward expansion of said edge of said disc, one of said support members being retained axially between the two ends of the other support member, and the other support member having two axially oppositely disposed end engagement surfaces for engagement by a holding means for securement to said pressure vessel.

* * * * *